Dec. 4, 1934.  S. D. HARTOG  1,983,290
PISTON STRUT
Filed Feb. 16, 1926
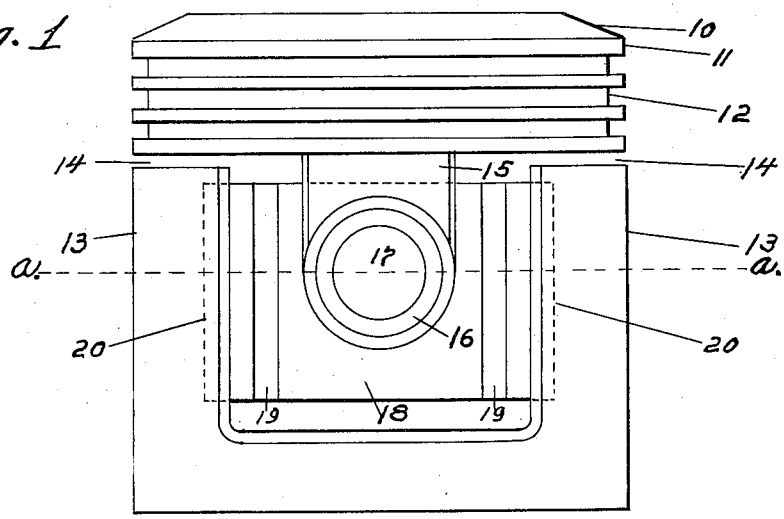
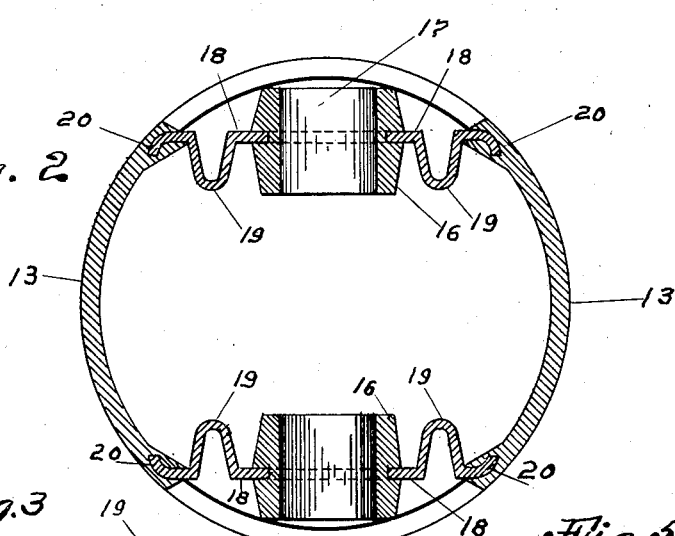
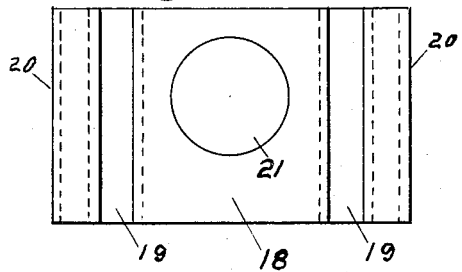
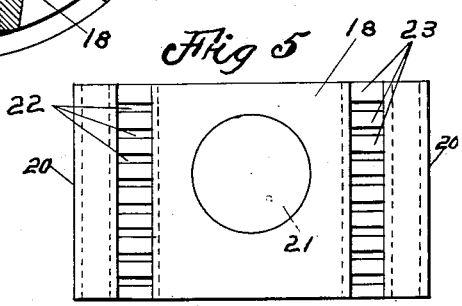
Inventor
Stephen D. Hartog Patented Dec. 4, 1934

1,983,290

UNITED STATES PATENT OFFICE 1,983,290

PISTON STRUT

Stephen D. Hartog, St. Louis, Mo., assignor, by mesne assignments, to The Cleveland Trust Company, Cleveland, Ohio, a corporation of Ohio Application February 16, 1926, Serial No. 88,706

2 Claims. (Cl. 309—13)

This invention relates to a sheet metal piston strut for use, more particularly, in assembly with a piston.

In the prior art there are pistons having transverse ribs or struts which connect the guide body of the piston with the head portion, and in all of the pistons thus constructed considerable difficulty is experienced in their operative performance, due to the expansion of the struts, resulting from the high heat temperature conducted from the head of the piston to the struts, the effect of which is to cause a lengthwise expansion of the strut and in consequence of which excess frictional resistance is developed impeding not only the normal functioning of the engine, but frequently results in the piston chafing to such an extent as to render its future use impractical.

The present invention overcomes all of the objections to which reference has been made by a simple, economical and efficient construction of a piston strut, characterized by the feature of having a yielding reflex action under high heat temperatures, maintaining constant uniform bearing contact of the guide body of the piston with that of the cylinder in which the piston operates.

The object, therefore, of the present invention is to construct the piston strut in such a novel way whereby it is enabled to expand and contract uniformly and yieldingly when associated in assembly engagement with a piston so as to enable the piston to operate successfully under any and all of the varying heat temperatures to which it may be subjected.

To such ends the invention comprises a sheet metal plate having embossed projections formed to provide a spring like flexure and adapted for association and assembly engagement with a piston.

For the purpose of enabling others to understand, make, and use this invention the following description is given supplemented by an accompanying drawing in which:

Fig. 1 is a side elevation of a piston.

Fig. 2 is a plan elevation in section along the line A—A Fig. 1.

Fig. 3 is an end view of the metallic strut.

Fig. 4 is a side elevation of the metallic strut.

Fig. 5 is a side view of the metallic strut illustrating a modification thereof.

Referring to the drawing reference character 10 indicates the head of a piston of well known conventional structure, a depending circumferential rim 11 in which piston ring grooves 12 are formed and a guide body 13 which is separated from the head 10 by spaced opening 14. Integral with the head 10 and midway of the guide body 13 is a depending rib 15 having piston pin supporting bosses 16 in which a piston pin hole 17 is formed adapted to support a piston pin. Figure 1 indicates in general outline a design of piston in common use, excepting the transverse rib or strut 18, a side elevation of which is illustrated in assembled engagement with the piston. Figure 2 illustrates in cross-section along the line A—A Fig. 1 the position and arrangement of the strut 18 in assembly engagement with the guide body 13 of the piston. The strut 18 is formed of sheet metal dimensioned properly and by the process of die forming embossed projections 19 are formed having upturned curved edges 20, and a hole 21 suitably disposed in approximately the central portion of the strut 18.

In the drawing Figure 5 indicates in modification the strut 18 and in that the embossed portions 19 have slits 22 cut therethrough for the purpose of providing a varying capacity of yieldability of the embossed portions 19 without sacrificing or minimizing the inherent tensile strength of the material of which the strut 18 is composed. The slits 22 in the strut 18 further provide cooling means for the stay portions 23 of the strut 18. In the cross-section Figure 2 the assembly position of the strut 18 indicates the upturned edges 20 in engaged relationship with the guide body 13 of the piston.

It is obvious from the position and assembly engagement of the strut 18 that any pressure exerted upon the guide body 13 will cause the guide body 13 to yield radially and as the heat temperature will cause the head portion 10 to expand, the depending ribs 15 will therefore have a movement radially outward, a position of 90 degrees around from the guide body 13. The flexure of yieldability of the strut 18, therefore, must be such that it will yield or flex in radially opposite positions to compensate for the forces acting in different directions, moreover, the yieldability or flexure of the strut 18 can be predetermined and made as sensitive to the influence of heat or pressure as may be required by simply increasing or decreasing the number and relative spacing of the slots 22 cut in the embossed projecting portions 19, the depth of which being indicated along the line B—B Figure 3.

The strut 18 presents no practical difficulties in its production, a form of this kind is very cheaply and economically produced by the process of die forming, and in the production of a piston comprising the character of strut constituting the subject matter of this invention it is very easily made. After the strut has been suitably formed it is appropriately positioned within a mold and the body of the metal constituting the form of the piston is cast and the strut 18 will take a position within the piston as illustrated in Figure 1. From the foregoing description it is clear that my invention is thoroughly practical in construction and application and fully accomplishes the purpose for which it is intended.

Having thus fully described my invention, what I claim as new and desire to secure by Letters Patent of the United States is:

1. The combination with a piston comprising a head segment, and a skirt segment, wrist pin bosses rigidly connected to said head and skirt segments, of sheet metal members forming transverse struts rigidly supported by said skirt segments and wrist pin bosses and yieldable therebetween, said members being formed with bowed portions at opposite sides of said wrist pin bosses and provided with a plurality of transverse slots extending transversely through the apex of the bowed portions.

2. As a new article of manufacture, a flexible and expansible strut for a piston having wrist pin bosses and skirt segments, comprising a sheet metal plate having bowed portions at opposite ends of said plate, a plurality of parallel slots formed in said bowed portions to provide a varying capacity of yieldability of said bowed portions, and edge portions extending laterally from said bowed portions adapted for assembly engagement with the body of said piston.

STEPHEN D. HARTOG.